Nov. 6, 1962 — H. W. KOPP — 3,062,547

DEFENSIVE REACTION FOOTBALL TRAINING SLED

Filed Jan. 9, 1961 — 3 Sheets-Sheet 1

Inventor:
Harold W. Kopp,
by Arthur D. Thomson
Attorney

Nov. 6, 1962 H. W. KOPP 3,062,547
DEFENSIVE REACTION FOOTBALL TRAINING SLED
Filed Jan. 9, 1961 3 Sheets-Sheet 2

Inventor:
Harold W. Kopp,
by Arthur D. Thomson
Attorney

Nov. 6, 1962 H. W. KOPP 3,062,547
DEFENSIVE REACTION FOOTBALL TRAINING SLED
Filed Jan. 9, 1961 3 Sheets-Sheet 3
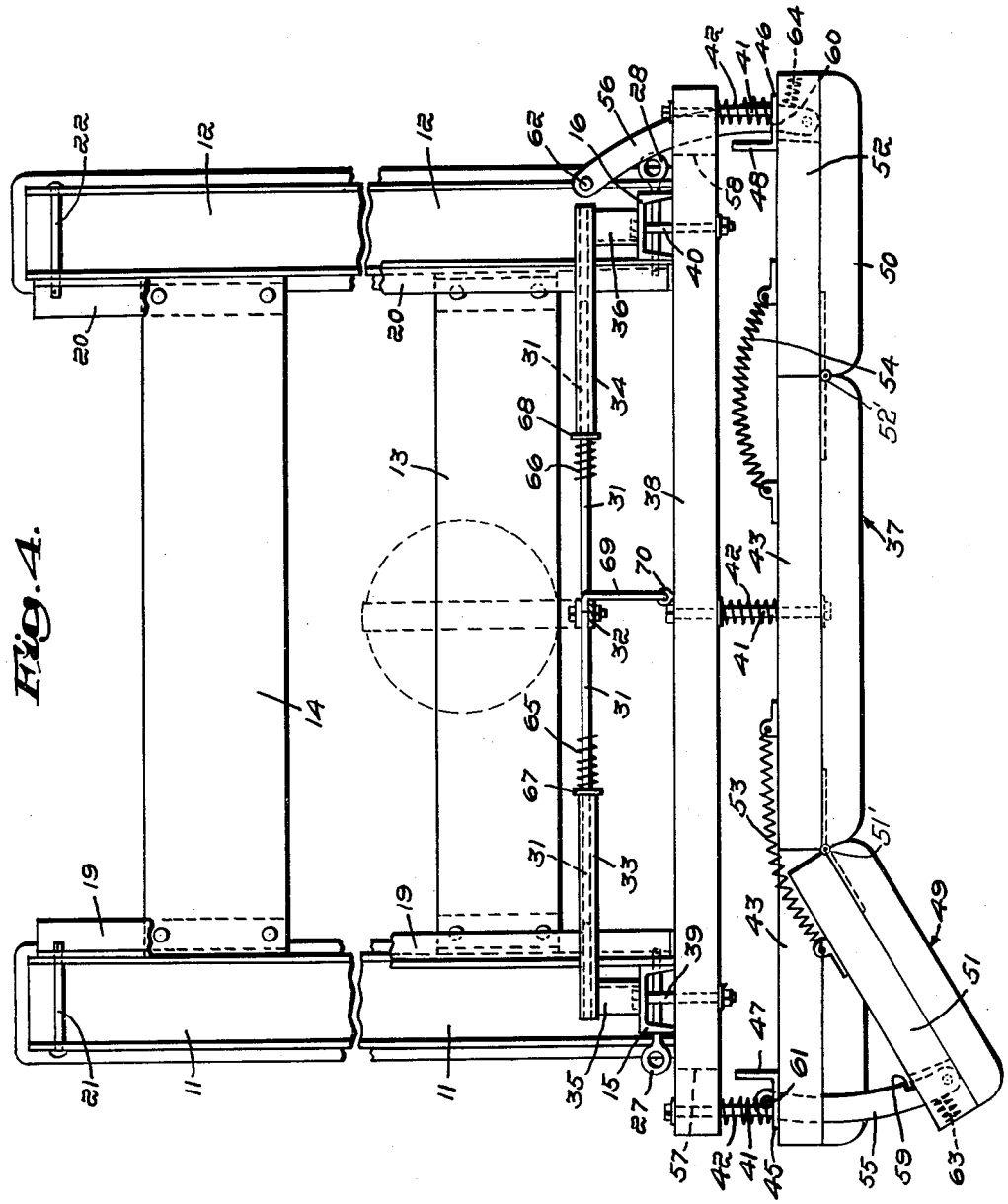
Inventor:
Harold W. Kopp,
by Arthur D. Thomson
Attorney United States Patent Office 3,062,547
Patented Nov. 6, 1962

3,062,547
DEFENSIVE REACTION FOOTBALL TRAINING
SLED
Harold W. Kopp, Saxonville, Mass. (% B. U. Athletic
Association, 32 Gaffney St., Boston 15, Mass.)
Filed Jan. 9, 1961, Ser. No. 81,292
7 Claims. (Cl. 273—55)

This invention relates to training apparatus for developing the physical and mental reactions of the linemen of a football squad, and pertains more particularly to a defensive reaction training sled devised to stimulate and perfect the reflexes of defensive linemen.

The principal purpose of the invention is to provide relatively simple and efficient apparatus for training a defensive lineman to move or charge in the most effective direction immediately upon observation of the first movement of the opposing offensive blocker, in a simulated game situation.

Another object is to provide a training sled equipped with a movable symbol which may be shifted forwardly, rearwardly and sidewise, under the control of the instructing coach, to simulate the initial action of the head of an offensive line blocker, in teaching the modern theory of defensive line play, namely, that the defensive player watches the first movement of his offensive blocker (rather than the movement of the ball) in timing and aiming his defensive movement or charge. For this purpose, the apparatus comprises a football helmet, actual or simulated, so mounted that it may be shifted laterally or swung backwardly or forwardly by the coach, to simulate a corresponding movement of the head and helmet of an offensive blocker at the starting signal of an actual play on the gridiron.

A further object of the invention is to coordinate the lateral shifting of the said helmet, or other movable objective symbol observed by the defensive lineman, with the movement of one of two swingable, padded arms which are associated with a padded bumper and which represent the arm and shoulder movement of an opposing offensive blocker or an adjacent offensive lineman. The coordination is such that a substantial degree of sidewise movement of the helmet, to the left or to the right, causes the corresponding left or right padded arm of the training sled to swing forwardly toward the defensive player, thereby simulating the blocking movement or position of his opponent's body. Thus, as the defensive man observes and follows the lateral movement of the helmet symbol, he will be alerted to the expected forward movement of the padded arm, and will react accordingly by appropriate evasive maneuvers, if well trained.

Hence, the use of the novel training sled not only instructs the defensive player to react instantly and to respond by appropriate counteraction by developed reflex movement, upon any movement of his opponent's helmet, but also forecasts the expected direction of his opponent's arm and shoulder charge, and trains him to take effective counter measures to evade the offensive block and complete his defensive assignment on any particular play. For example, when a sidewise movement of the blocker is thus predicted, the defensive man will, in training, charge toward the forwardly swung padded arm and close it, before continuing his sideward charge to evade the block.

Similarly, when the helmet symbol is moved forwardly or rearwardly by the coach, the defensive charge is timed and directed to best counteract such simulated movement of the offensive blocker. In all training situations, the defensive lineman is taught to move on the movement of the offensive blocker, to interpret the direction of the latter's movement from the movement of the helmet symbol of the training sled, and to react immediately and most effectively. Backward movement of the helmet would indicate, for example, that the offensive blocker intends to pull out of the line as a running interferer or trap blocker.

The novel training sled is preferably designed for use both outdoors and indoors, and to remain stationary on the ground or floor when in use, if a fixed position of the sled is desired. A single sled may be used for training a succession of individual linemen, or a battery of multiple units, each preferably comprising the movable helmet symbol and padded arm sections, may be used in training a complete defensive line, with line backers if desired. In the multiple unit sled, the helmet symbols could be operated separately or suitably connected to be moved simultaneously by a single coach.

The foregoing objectives and other advantageous features of a defensive reaction training sled constructed in accordance with this invention will be apparent from the following description of the recommended embodiment of the invention illustrated in the accompanying drawings; but it will be understood that the structural details of the apparatus herein illustrated and described may be varied in form and design without departing from the essence of the invention as defined in the appended claims.

In the drawings:

FIG. 4 is a plan view of the sled, partly broken away, showing one of the arms in forward position and showing the helmet support in section, and indicating the helmet, in broken lines, in central position and swung rearwardly.

Figure 1:
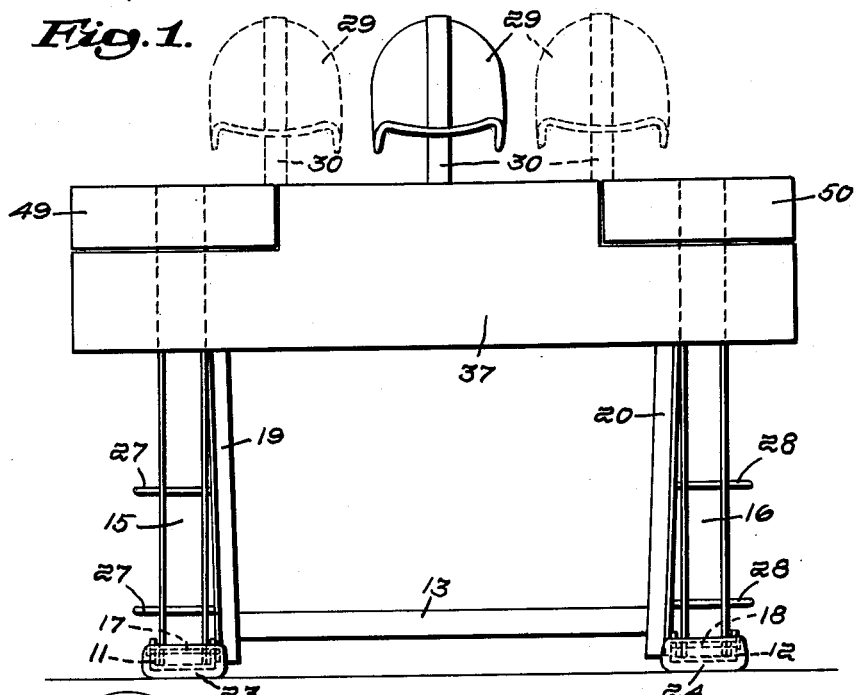
FIG. 1 is a front elevation of the training sled, showing the helmet symbol and padded arm sections in normal position, and showing the base member of the sled equipped with antiskid boots for indoor use.

In the form shown in the drawings, the frame of the training sled comprises a pair of spaced parallel base members 11 and 12 which may be metal channels joined by cross members 13 and 14 suitably fastened to the channels; a pair of upright channel posts 15 and 16 detachably secured adjacent the forward ends of the respective base members, as by removable pins or bolts 17, 18 passing through holes in the respective channels; and a pair of inclined braces 19 and 20 detachably secured at their opposite ends to the respective base members and uprights, as by similar removable pins or bolts 21, and 22. These frame parts (and the hereafter described elements which are mounted on the upright channels) may thus be dismantled for transportation or storage; or the braces 19 and 20 may be removed to permit the uprights and their attachments to fold down on the base members. It is apparent, however, that the frame parts may be rigidly connected, if desired.

For indoor use, the base members 11 and 12 are preferably provided with detachable boots 23 and 24 respectively (FIGS. 1 and 2), made of rubber or other antiskidding material, so that the sled will not slide appreciably when used on a wooden floor. These boots may be removably secured by lacing (not shown) or otherwise. For outdoor use, metal spikes 25 and 26, passing through eye-bolts or pins 27 and 28 in the uprights 15 and 16 respectively (FIG. 3) may be driven into the ground to hold the sled stationary. Other means for maintaining the sled in fixed position, indoors or out, may obviously be employed, as and when desired.

The frame above described carries and supports the objective helmet symbol, the padded bumper and its moveable arm sections, and their associated mechanisms, so that the movable arms and their associated stationary charging pad or bumper are supported at a height corresponding to the average shoulder height of an offensive lineman in blocking posture. The height of the padded bumper will depend upon the size of the average football players, in college, high school or junior high school, according to the type of school in which the training sled is to be used.

The helmet 29 is mounted on a bracket 30 which is fixed to a transverse rod 31, as by a suitable clamp 32, and rod 31 is rotatable and longitudinally s'ideable in a pair of sleeve members 33 and 34 welded respectively to a pair of short struts 35 and 36 which, in turn, are securely fastened to the upright posts 15 and 16. The sleeve members are aligned in a horizontal plane, in spaced axial relation, and the helmet is thus so supported that it can be shifted laterally, in either direction, relative to the front of the sled frame and the bumper thereon, and also tilted forwardly or rearwardly in a vertical plane, as indicated by the broken line positions of the helmet in FIGS. 1 and 2. A combination of the sliding shift and the rotational tilt, may also be effected, if desired. It is intended that the helmet be so manipulated by the line coach of a football squad, by grasping the helmet 29 or its supporting bracket 30, and sliding the objective symbol sidewise, or swinging it forwardly or backwardly, to simulate a predetermined hypothetical movement of the head of an offensive blocker when the starting signal for a particular play is called.

As is well understood, the starting signal is given by the quarterback of the offensive team and is unknown by the defensive team. Hence, the defensive line must time its charge by the snap of the football or by the head movements of opposing linemen. Defensive linemen using the training sled of this invention are instructed, as aforesaid, to watch the head movement of the opposite offensive blocker, rather than the movement of the football when snapped back by the center; and the helmet is the objective symbol of the blocker's head during training.

As usual in line training or charging sleds, a padded and spring-pressed bumper is provided to receive the charge of the lineman. In the example herein disclosed, a padded bumper 37 is mounted in front of a backboard 38 secured, as by bolts 39 and 40 (FIG. 4) to the front of the upright posts 15 and 16, respectively, in a horizontal plane parallel to the base of the sled frame. The bumper is supported in parallel relation to the backboard by stout bolts, as indicated at 41, and the bumper is slidable on said bolts toward and from the backboard. Compression springs 42, surrounding the bolts 41 tend to urge the bumper away from the backboard and normally hold it in spaced relation thereto. Other forms of resilient means may obviously be employed for this purpose. The padded bumper 37 has a stiffening panel 43 backing the padded portion 44 thereof, and angle plates 45, 46 are preferably attached adjacent the ends of the panel 43, as reinforcements for the bumper in the region of the outermost bolts 41, and for a purpose to be described below. The rearwardly projecting flanges 47, 48 of plates 45, 46 are adapted to abut the backboard 38, and thus limit the movement of the bumper toward the backboard, when the bumper is charged by the player.

Movable arm sections of the padded and spring-pressed bumper, here shown as the upper corner sections 49 and 50, are hinged to the bumper proper so that they may be swung forwardly and inwardly with respect to the bumper, to provide the swinging arm members mentioned above. Each arm section comprises a padded panel similar to the bumper proper, and each arm panel 51, 52 is pivotally connected to the bumper as by hinges 51' and 52' (FIG. 4), so that the arm members may swing in a horizontal plane.

Figure 2:
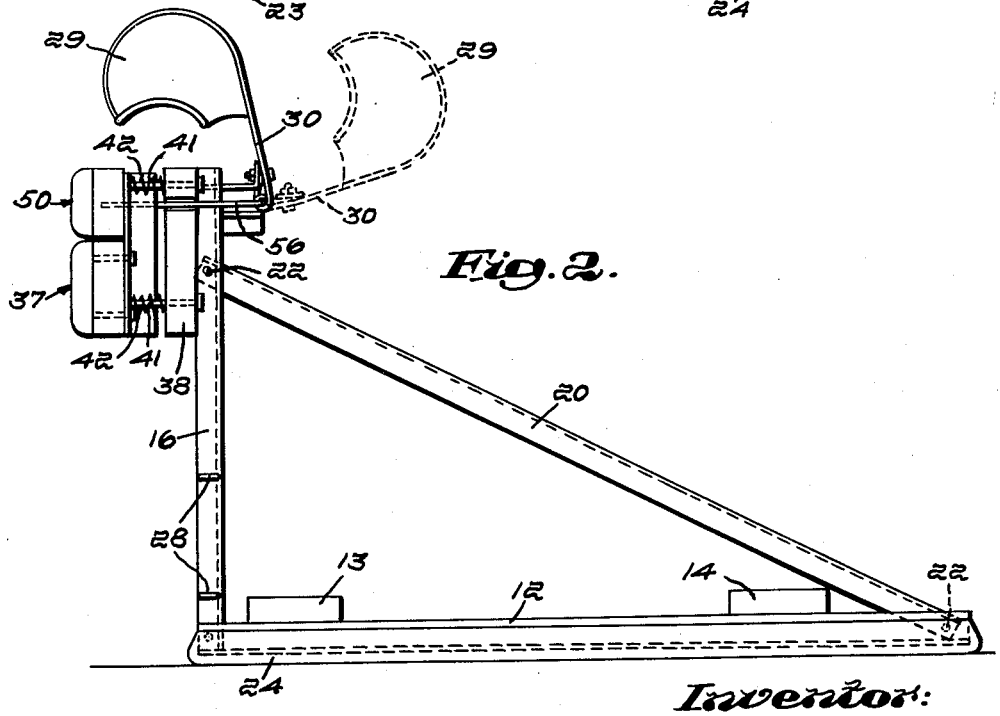
FIG. 2 is a side elevation looking to the left of FIG. 1.
Figure 3:
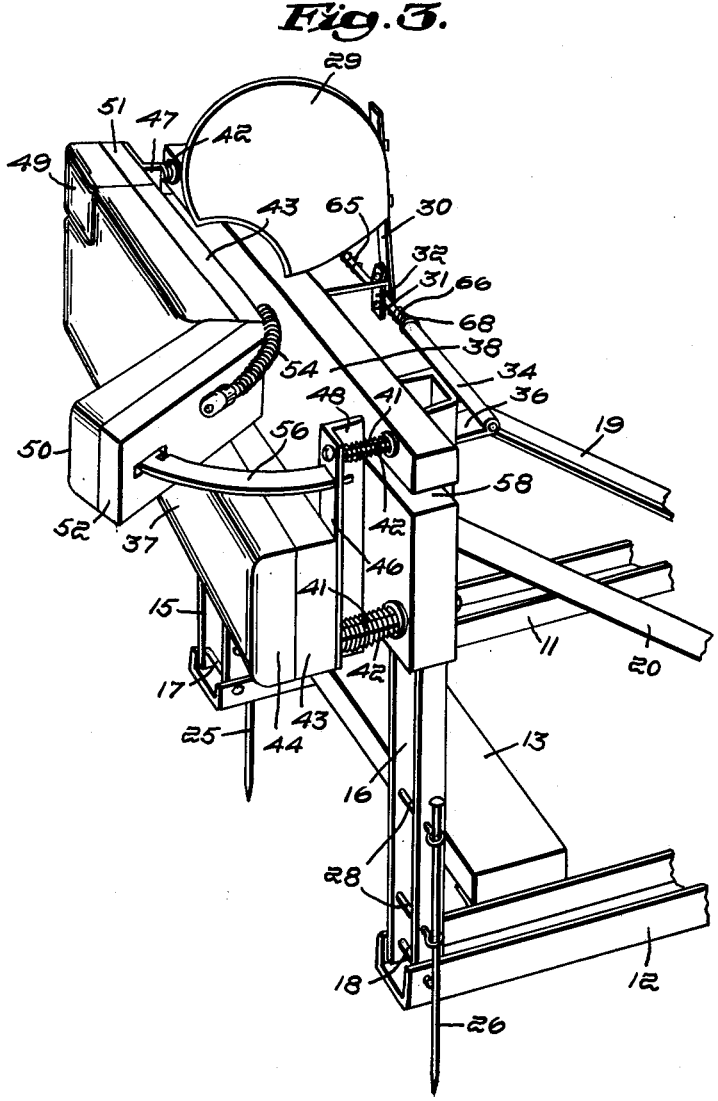
FIG. 3 is a fragmentary perspective of the front of the apparatus, showing the position of the helmet and one of the padded arms after the helmet has been shifted sidewise, and showing the sled equipped with spikes to hold it stationary for outdoor use.

The arms are constantly urged forwardly, as to open position shown at the right of FIG. 3 or the left of FIG. 4, by compression springs 53 and 54 fastened to the respective arm members and to the panel 43 of the main bumper. Other types of springs or resilient means may obviously be employed for this purpose. Such spring action is normally restrained by latch means which hold the arm members in closed position, substantially in alignment with the bumper proper, as shown in FIGS. 1 and 2, and at the left of FIG. 3 and right of FIG. 4; the latch means of one arm being released as a result of extreme lateral sliding movement of the helmet 29 in the direction of that arm member.

The latch means illustrated in the drawings comprise a pair of curved levers 55 and 56 pivoted at one end within accommodating recesses of the panel backs 51 and 52, respectively, and passing through complemental openings in the angle irons 47, 48, and then through slots 57, 58 in the backboard 38; the opposite ends of the respective latch levers terminating adjacent the outer ends of the sleeve members 33 and 34 respectively in the path of movement of rod 31, as best shown in FIG. 4. The respective latch levers have edge notches 59 and 60 adapted to be engaged by an edge portion of the slotted angle irons 45 and 46 respectively, to hold the arm sections in normally closed position, as shown at the right of FIG. 4. Studs 61 and 62 in the free ends of the respective latch levers engage said angle irons to limit forward swinging movement of the arm members, when the latch means is released. Coiled springs 63 and 64 disposed in recesses in arm panels 51, 52 releasably hold the latch levers in locking position.

One of the arm latches is thus disengaged from its locked position, and the arm is released to swing forwardly under action of the associated compression spring 53 or 54 by sidewise movement of the helmet-carrying rod 31. As shown in FIG. 4, extreme movement of rod 31 to the right of the figure will slide that end of the rod completely through the sleeve 34 and against the free end of latch lever 56, adjacent stud 62. The free lever end will then be forced outwardly to release the latch, whereupon arm member 50 will swing forwardly.

When the coach desires to release arm 50, the helmet 29 or its supporting bracket 30 is manually moved to the right of FIG. 4 with an abrupt and forceful motion; and rod 31 is driven outwardly to strike latch 56. To relieve the force of impact of clamp 32 on the inner end of sleeve 33 or 34, coiled springs 65 and 66 and associated washers 67 and 68 encircle the rod 31, as shown in said figure.

In order to maintain the helmet symbol in upright position when it is not in the grasp of the coach, a hook member 69, secured at one end by the clamp piece 32 and hooking into an eye 70 on backboard 38, may be provided. It will be understood that the hook is disengaged before the training sled is used for instruction purposes, so that the instructing coach may manipulate the objective helmet by swinging it forwardly or rearwardly as the rod 31 rotates in sleeves 33, 34 and by shifting it laterally as the rod slides in said sleeves. It will also be apparent that the helmet may be moved sidewise, to a limited extent in either direction, without releasing the latch levers, whenever the coach does not desire an arm member to swing forwardly.

Th objective helmet symbol 29 is normally disposed rearwardly of padded bumper 37 and projects above the bumper, so that it may be observed by a trainee lineman who has assumed a charging stance in front of the training sled; and said symbol will normally occupy the relative position of the head of an offensive line blocker in an actual game situation. Movement of the helmet by the coach or instructor, in any predetermined direction signals the charge of the defensive trainee, as previously explained.

I claim:

1. A defensive reaction training sled, comprising a frame, a bumper connected to the front of the frame, a movable objective symbol, representing the position of the head of an offensive lineman, disposed upwardly and rearwardly of the bumper, means carried by the frame for supporting the objective symbol for tilting movement forwardly and rearwardly and for substantial sliding movement laterally with respect to the bumper, when said symbol is manipulated by a coach, said symbol being observable by a trainee in position to charge said bumper, so that the direction of his charge is influenced by the direction of movement of said symbol.

2. A training sled as described in claim 1, also comprising movable arm sections pivotally connected to said bumper at opposite sides thereof, respectively, resilient means constantly tending to swing said arm sections forwardly and inwardly of the bumper, latch means normally holding the respective arm sections in substantial alignment with said bumper, and means responsive to extreme lateral movement of said objective symbol, in either direction, for releasing the latch means holding one of said arm sections, so that such released section swings forwardly of the bumper.

3. A defensive reaction training sled comprising a frame, a bumper connected to the front of the frame and disposed transversely thereof in spaced relation to the bottom of the frame, a movable shaft disposed horizontally of the frame rearwardly of the bumper, means comprising axially spaced sleeves supporting said shaft for rotational and substantial longitudinal sliding movement in said sleeves, an objective symbol, representing the position of the head of an offensive lineman, fixed to said shaft intermediate said sleeves and movable forwardly, rearwardly and laterally with respect to said bumper when said symbol is manipulated by a coach, said symbol normally projecting above said bumper and being observable by a trainee in position to charge said bumper, so that the direction of his charge is influenced by the direction of movement of said symbol.

4. A training sled as described in claim 3, said bumper having movable arm sections pivotally connected thereto at opposite sides thereof, respectively, for swinging movement forwardly and inwardly with respect to the bumper, resilient means constantly tending to swing the respective arm sections forwardly, latch means normally holding the respective sections in inoperative position and in substantial alignment with the bumper, and means operative in response to extreme lateral sliding movement of said shaft in either direction for releasing the latch means holding one of said arm sections, so that such released section swings forwardly of the bumper.

5. A defensive reaction training sled comprising a frame, a padded bumper, resilient means supporting the bumper transversely of the front of the frame in spaced relation to the bottom thereof, a movable rod disposed rearwardly of the bumper in spaced parallel relation thereto, means comprising axially spaced sleeves supporting said rod for rotational and substantial longitudinal sliding movement in said sleeves, an objective helmet symbol, representing the position of the head of an offensive lineman, fixed to said rod and normally projecting above the bumper so that it is observable by a trainee in position to charge the bumper, said objective helmet being movable, with said rod, forwardly, rearwardly and laterally with respect to the bumper when manipulated by a coach.

6. A training sled as described in claim 5, said bumper having padded, movable arm sections hinged thereto at opposite sides thereof, respectively, for swinging movement in a substantially horizontal plane forwardly and inwardly with respect to the bumper, resilient means constantly tending to cause such movement, latch means normally holding the respective arm sections in inoperative position and in substantial alignment with said bumper, and means operative in response to extreme lateral sliding movement of said rod in one direction for releasing the latch means holding one of said sections, so that such released section swings forwardly of the bumper.

7. A training sled as described in claim 6, said latch and releasing means comprising a lever pivoted to and extending rearwardly of each arm section, the free end of said lever being disposed in the path of longitudinal movement of said rod when the arm section is latched in inoperative position, so that said free end is engageable by the end of said rod when the rod is moved laterally toward said lever end.

References Cited in the file of this patent

UNITED STATES PATENTS

| | | |
|---|---|---|
| 2,521,649 | Paupa | Sept. 5, 1950 |
| 2,967,709 | Stahley | Jan. 10, 1961 |